United States Patent
Loaiza et al.

(10) Patent No.: US 11,954,117 B2
(45) Date of Patent: Apr. 9, 2024

(54) ROUTING REQUESTS IN SHARED-STORAGE DATABASE SYSTEMS

(71) Applicant: Oracle International Corporation, Redwood Shores, CA (US)

(72) Inventors: Juan R. Loaiza, Woodside, CA (US); Wei-Ming Hu, Palo Alto, CA (US); Mark Dilman, Sunnyvale, CA (US); Leonid Novak, Castro Valley, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 249 days.

(21) Appl. No.: 15/845,747

(22) Filed: Dec. 18, 2017

(65) Prior Publication Data

US 2019/0102408 A1    Apr. 4, 2019

Related U.S. Application Data

(60) Provisional application No. 62/566,158, filed on Sep. 29, 2017.

(51) Int. Cl.
*G06F 16/27* (2019.01)
*G06F 16/22* (2019.01)
*G06F 16/2458* (2019.01)

(52) U.S. Cl.
CPC .......... *G06F 16/27* (2019.01); *G06F 16/2282* (2019.01); *G06F 16/2471* (2019.01); *G06F 16/278* (2019.01)

(58) Field of Classification Search
None
See application file for complete search history.

(56) References Cited

U.S. PATENT DOCUMENTS

| 5,721,909 A | 2/1998 | Oulid-Aissa et al. |
| 5,909,570 A | 6/1999 | Webber |
| 6,134,549 A | 10/2000 | Regnier et al. |
| 6,272,523 B1 | 8/2001 | Factor |

(Continued)

FOREIGN PATENT DOCUMENTS

| GB | 2459354 | 10/2009 |
| JP | 2007206913 | 8/2007 |
| WO | WO 98/44400 | 10/1998 |

OTHER PUBLICATIONS

Jingren Zhou et al., "Advanced Partitioning Techniques for Massively Distributed Computation", dated Jan. 2, 2012, 12 pages.

(Continued)

*Primary Examiner* — Kris E Mackes
*Assistant Examiner* — Cao D Vuong
(74) *Attorney, Agent, or Firm* — Hickman Becker Bingham Ledesma LLP

(57) ABSTRACT

Techniques are described herein for routing queries to particular nodes of a multi-node database system based on the query. A database table is partitioned into a plurality of affinity groups. Each affinity group is assigned a particular node as the master node of the affinity group. A mapping is sent to a query router indicating the master node for each affinity group of the plurality of affinity groups. The query router determines, for a particular query, a target node to which to send the particular query based on the mapping and the particular query.

30 Claims, 5 Drawing Sheets

(56) References Cited

U.S. PATENT DOCUMENTS

| | | | |
|---|---|---|---|
| 6,310,883 B1 | 10/2001 | Mann et al. | |
| 6,393,415 B1* | 5/2002 | Getchius | G06F 16/24552 |
| 6,405,198 B1* | 6/2002 | Bitar | G06F 16/2282 |
| 6,523,036 B1* | 2/2003 | Hickman | G06F 16/27 |
| | | | 707/704 |
| 6,826,753 B1 | 11/2004 | Dageville et al. | |
| 6,880,002 B2 | 4/2005 | Hirschfeld et al. | |
| 7,225,240 B1 | 5/2007 | Fox et al. | |
| 7,386,849 B2 | 6/2008 | Dageville et al. | |
| 7,493,400 B2 | 2/2009 | Loaiza et al. | |
| 7,702,676 B2 | 4/2010 | Brown et al. | |
| 7,805,407 B1 | 9/2010 | Verbeke et al. | |
| 7,809,690 B2 | 10/2010 | Pommerenk et al. | |
| 7,814,065 B2 | 10/2010 | Chan et al. | |
| 8,065,284 B2 | 11/2011 | Kaplan | |
| 8,117,488 B2 | 2/2012 | Chan et al. | |
| 8,271,468 B1 | 9/2012 | Peddy et al. | |
| 8,285,710 B2* | 10/2012 | Bent | G06F 16/2471 |
| | | | 709/224 |
| 8,527,473 B1 | 9/2013 | Brown et al. | |
| 8,540,556 B2 | 9/2013 | Hiddink et al. | |
| 9,507,843 B1* | 11/2016 | Madhavarapu | G06F 3/0619 |
| 9,575,272 B2* | 2/2017 | Ott | G02B 6/4471 |
| 9,723,054 B2* | 8/2017 | Petculescu | H04L 67/02 |
| 10,303,143 B2* | 5/2019 | Hatanaka | G05B 19/0421 |
| 10,650,017 B1* | 5/2020 | Gupta | G06F 16/254 |
| 2001/0023476 A1 | 9/2001 | Rosenzweig | |
| 2002/0087798 A1 | 7/2002 | Perincherry et al. | |
| 2002/0116457 A1 | 8/2002 | Eshleman et al. | |
| 2002/0178276 A1 | 11/2002 | McCartney et al. | |
| 2003/0081748 A1 | 5/2003 | Lipinski | |
| 2003/0204505 A1 | 10/2003 | Cotner et al. | |
| 2004/0030801 A1 | 2/2004 | Moran et al. | |
| 2004/0205310 A1 | 10/2004 | Yamagami | |
| 2004/0210582 A1* | 10/2004 | Chatterjee | G06F 16/27 |
| | | | 707/999.009 |
| 2004/0243647 A1 | 12/2004 | Oheda | |
| 2004/0249788 A1 | 12/2004 | Dant | |
| 2005/0097187 A1 | 5/2005 | Thompson et al. | |
| 2005/0114309 A1 | 5/2005 | Dettinger et al. | |
| 2005/0228822 A1 | 10/2005 | Wason | |
| 2006/0031243 A1 | 2/2006 | Boyle et al. | |
| 2006/0036989 A1 | 2/2006 | Chaudhuri et al. | |
| 2006/0064478 A1 | 3/2006 | Sirkin | |
| 2006/0242356 A1 | 10/2006 | Mogi et al. | |
| 2006/0265420 A1 | 11/2006 | MacNaughton et al. | |
| 2007/0005786 A1 | 1/2007 | Kumar et al. | |
| 2007/0022100 A1 | 1/2007 | Kitsuregawa et al. | |
| 2007/0245088 A1 | 10/2007 | Mogi et al. | |
| 2008/0162583 A1 | 7/2008 | Brown et al. | |
| 2009/0034537 A1 | 2/2009 | Colrain et al. | |
| 2009/0144338 A1 | 6/2009 | Feng et al. | |
| 2009/0182718 A1 | 7/2009 | Waclawik et al. | |
| 2009/0198736 A1 | 8/2009 | Shen et al. | |
| 2009/0216438 A1 | 8/2009 | Shafer | |
| 2009/0240664 A1* | 9/2009 | Dinker | G06F 12/0866 |
| 2010/0174863 A1 | 7/2010 | Cooper et al. | |
| 2011/0106778 A1 | 5/2011 | Chan et al. | |
| 2011/0276579 A1 | 11/2011 | Colrain et al. | |
| 2012/0166483 A1 | 6/2012 | Choudhary et al. | |
| 2012/0173774 A1 | 7/2012 | Lee et al. | |
| 2012/0310916 A1* | 12/2012 | Abadi | G06F 16/24542 |
| | | | 707/E17.017 |
| 2014/0101100 A1 | 4/2014 | Hu et al. | |
| 2014/0122510 A1* | 5/2014 | Namkoong | G06F 16/278 |
| | | | 707/755 |
| 2015/0120659 A1* | 4/2015 | Srivastava | G06F 11/2038 |
| | | | 707/625 |
| 2016/0026667 A1 | 1/2016 | Mukherjee et al. | |
| 2016/0026684 A1* | 1/2016 | Mukherjee | G06F 3/067 |
| | | | 707/713 |
| 2016/0062694 A1* | 3/2016 | Makkar | G06F 3/0643 |
| | | | 711/111 |
| 2016/0188426 A1* | 6/2016 | Kousha | G06F 16/00 |
| | | | 714/4.12 |
| 2017/0103098 A1 | 4/2017 | Hu et al. | |
| 2018/0089312 A1* | 3/2018 | Pal | G06F 16/335 |

OTHER PUBLICATIONS

"Mongo Documentation—Sharding", dated Oct. 14, 2012, pp. 101-151, http://wayback.archive.org/web/20121014171613.

European Patent Office, "Communication Pursuant to Article 94(3) EPC", in Application No. 18773005.6, dated Dec. 21, 2021, 12 pages.

European Claims in Application No. 18773005.6, dated Dec. 2021, 5 pages.

U.S. Appl. No. 12/776,341, filed May 7, 2010, Final Office Action.

U.S. Appl. No. 12/776,341, filed May 7, 2010, Office Action.

U.S. Appl. No. 12/776,341, filed May 7, 2010, Notice of Allowance.

U.S. Appl. No. 12/776,341, filed May 7, 2010, Advisory Action.

Current Claims in European Patent Application No. 18773005.6, dated Jun. 29, 2022, 5 pages.

* cited by examiner

ROUTING REQUESTS IN SHARED-STORAGE DATABASE SYSTEMS

BENEFIT CLAIM

This application claims the benefit of Provisional Appln. 62/566,158, filed Sep. 29, 2017, the entire contents of which is hereby incorporated by reference as if fully set forth herein, under 35 U.S.C. § 119(e).

FIELD OF THE INVENTION

The present invention relates to database management systems, and specifically to routing requests for a shared-storage database system.

BACKGROUND

Database systems typically store database objects (e.g., tables, indexes, etc.) on disk, and load data items from those database objects into volatile memory on an as-needed basis. Once loaded into volatile memory, the data items may remain cached in volatile memory so that subsequent accesses to the same data items will not incur the overhead of accessing the data items from disk.

A clustered shared-disk database system comprises a plurality of nodes. If several nodes access the same data items, the data items may be cached in volatile memory of each node. However, locking and updating mechanisms are required to maintain cache coherency between the different nodes. Furthermore, performing inter-node requests for locks, and obtaining the data items from the volatile memory of other nodes, negatively impacts the performance and scalability of the database system.

A possible approach is to load a copy of the database object into the volatile memory of a single node in the cluster. To gain the benefit of having pre-loaded the object, work related to the object may be shipped to the node that pre-loaded the object. Or, data may be sent from the node that pre-loaded the object to the node that received the work. Even though shipping the work or receiving the data may be faster than accessing the on-disk object, shipping work or requesting data requires additional time.

Another possible approach is to divide and store database data in separate databases. Each database is assigned to a particular node. This avoids having to maintain cache coherency between nodes, but nodes don't have direct access to database data that they are not assigned to. Thus, work requested of one database that requires data items that are stored in other databases takes longer for that database to complete.

A third possible approach is to hard-code database applications to route requests for particular database data to particular nodes, so that each node processes a disjoint subset of the data. However, to continue to be performant, the application has to be updated with new data-to-node mappings if access patterns change, the size of the data set changes, or if the number of available database instances changes.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for routing queries to particular nodes of a multi-node database system based on the query. According to an embodiment, a database table is partitioned into a plurality of affinity groups. Each affinity group is assigned to a particular node of the multi-node database system.

The particular node is the master node of the affinity group. The master node handles lock requests for the affinity group. If a node requires a lock for data in an affinity group, the node sends a lock request to the master node. However, if the master node requires a lock for the affinity group, then the master node does not need to send a request.

According to an embodiment, the database system generates an affinity group mapping indicating the assignment of affinity groups to nodes. The database system sends the affinity group mapping to query sources, which store the mapping locally. Before the database query source sends a query to the database system, the query source uses the mapping to determine a target node in the database system to route the query to. The query source then sends the query to the target node. Examples are described herein wherein the query source is a client application executing on a client node. However, a query source may be any source from which the database system receives queries.

In some embodiments, a query router determines a target node to route a query to. The query router may be a service, function, application, or other feature of, for example, a client application, a connection pool, a database listener, a software or hardware router, or a network switch. In an embodiment, the query router receives a database request, determines the target node, and forwards the database request to the target node. Alternately, the query router may indicate the target node to a query source, such as a client application.

System Overview

Figure 1:
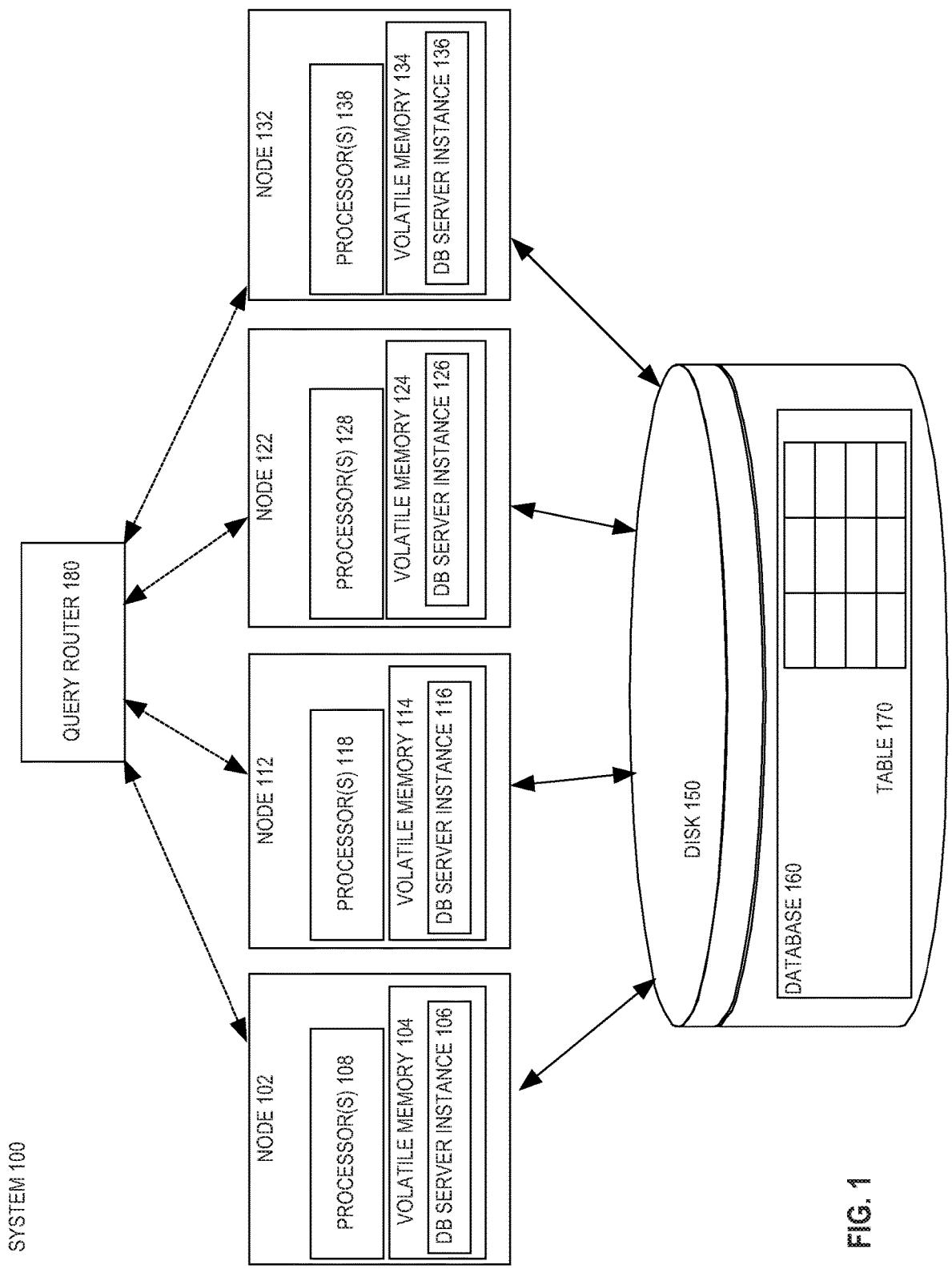
FIG. 1 is a block diagram illustrating a database system in which an embodiment can be implemented.

FIG. 1 is a block diagram illustrating a multi-node database system according to one embodiment. In the embodiment illustrated in FIG. 1, database system 100 includes four nodes, 102, 112, 122, and 132.

Nodes 102, 112, 122, and 132 respectively have one or more processors 108, 118, 128, and 138, and local volatile memory 104, 114, 124, and 134. In addition, nodes 102, 112, 122, and 132 are respectively executing database server instances 106, 116, 126, and 136. While in the illustrated embodiment each node is executing a single database server instance, in alternative embodiments a single node may execute more than one database server instance.

Nodes 102, 112, 122, and 132 have access to the same database 160. For the purpose of illustration, database 160 is shown as stored on a single shared disk 150, but in alternative embodiments may be spread across multiple disks to which each of nodes 102, 112, 122, and 132 have access. Additionally, database 160 may be stored in other types of computer-readable storage media such as flash storage or non-volatile memory. Database 160 includes a table 170. Each of nodes 102, 112, 122, and 132 is able to access data items from table 170 from the copy of table 170 that resides on disk 150.

In some embodiments, database 160 is a distributed database comprising a plurality of databases each stored in a respective one or more storage media. The nodes may each have access to a particular database of the plurality of databases, rather than shared access to the plurality of databases. In other embodiments, nodes may have shared access to one or more databases of the plurality of databases. For example, a first set of nodes may have shared access to a first database of the plurality of database, and a second set of nodes may have shared access to a second database of the plurality of database.

A query router 180 is connected to database system 100. The query router may be any hardware or software that receives queries and determines a target node to route the query to. For example, the query router may be a service, function, application, or other feature of, for example, a client application, a connection pool, a database listener, a software or hardware router, or a network switch. In an embodiment, the query router receives a database request, determines the target node, and forwards the database request to the target node. Alternately, the query router may indicate the target node to a query source, such as a client application.

In an embodiment, query router 180 is a database client that connects to database system 100. Client 180 may comprise a database application running on a client node. Client 180 interacts with an instance of database system 100, such as instances 106, 116, 126, and 136, by submitting commands that cause the instance to perform operations on data stored in the database. For example, a command may be a request to access or modify data from the database, perform operations on the data, and/or return the data to the client.

Additionally, multiple commands may be sent from the database client to the database instance in a single request to perform work. The database instance may return results to the database client in a single response to all commands that were submitted in the request. As an example, as described in further detail below, a database client may send a request that includes a particular query and a request for an affinity group mapping. Handling multiple commands in a single roundtrip request and response results in more efficient use of database connections.

Affinity Groups

In order to assign portions of database objects to particular nodes, database objects, such as table 170, are partitioned into a plurality of affinity groups. An affinity group is the portion of a database object that is assigned to a node for the purposes of routing point and/or range queries.

In an embodiment, a database table is partitioned into affinity groups based on data values in the database table. For example, each affinity group may correspond to one or more values, or range of values, in a column of the database table.

For the purpose of illustrating a clear example, assume a "Customers" database table stores customer data and includes a "lastName" column. The "Customers" table may be partitioned into affinity groups based on values stored in the "lastName" column. A first affinity group may correspond to last name values starting with the letters A through D, a second affinity group may correspond to last name values starting with the letters E through H, a third affinity group may correspond to last name values starting with the letters I through K, and so on.

The key column (or columns) on which the database table is partitioned is referred to herein as an "affinity group key." Each affinity group corresponds to a particular value, a particular set of values, or a particular range of values, of the affinity group key.

The partitioning used for affinity group purposes may or may not correspond to the on-disk structure of the database data. As an example of a situation in which the affinity partition is based on the on-disk partitioning, the database table may be stored in a plurality of data blocks. The database table may be partitioned based on the data blocks, such that each affinity group corresponds one or more data blocks of the plurality of data blocks. Each affinity group may still correspond to a range of values of an affinity group key.

In an embodiment, each affinity group may correspond to an equal, or close to equal, number of data blocks. However, the range of affinity group key values may vary for each affinity group, based on the amount of data associated with each range. Referring to the above example, a first affinity group may correspond to last name values starting with the letters A through C, and a second affinity group may correspond to last name values starting with the letters D through K, while each affinity group corresponds to a similar number of data blocks.

A data block is a unit of persistent storage and is used by a database server to store one or more database rows, or portions of rows, including one or more columns of a row. When rows are read from persistent storage, a data block containing the row is copied into a data block buffer in RAM and/or main memory of a database server. A data block usually contains multiple rows, and data block metadata describing the contents of the data block.

A data block is the smallest unit of database data a database server may request from a persistent storage device. For example, when a database server seeks a row that is stored in a data block, the database server may only read the row from a persistent storage device by reading in the entire data block. Partitioning a database table based, at least in part, on the data blocks storing the database table avoids assigning different nodes to the same data block.

In an embodiment, the database table may be a partitioned database table comprising a plurality of table partitions. The plurality of affinity groups may correspond to the plurality of partitions. The affinity group key may be the partition key used to partition the database table. For example, each table partition may be stored in a respective set of one or more data blocks. All data blocks in a set may belong to the same affinity group and/or belong to affinity groups that are assigned to the same node.

Each affinity group of the plurality of affinity groups is assigned to a particular node in the database system. The node to which an affinity group is assigned is the master node for the affinity group. The master node manages lock requests for the affinity group. If a node receives a request for data that is stored in the affinity group for which it is the master node, then the node does not have to request a lock from another node. This allows the node to process the request more quickly.

The affinity groups may be assigned to nodes in the database system using any method for associating portions of a database object with particular nodes. Example methods include assigning in a round-robin fashion; dividing the plurality of affinity groups into equal or semi-equal sets, and assigning each set to a particular node; using a function to map affinity group key values to nodes; and etc.

Figure 2:
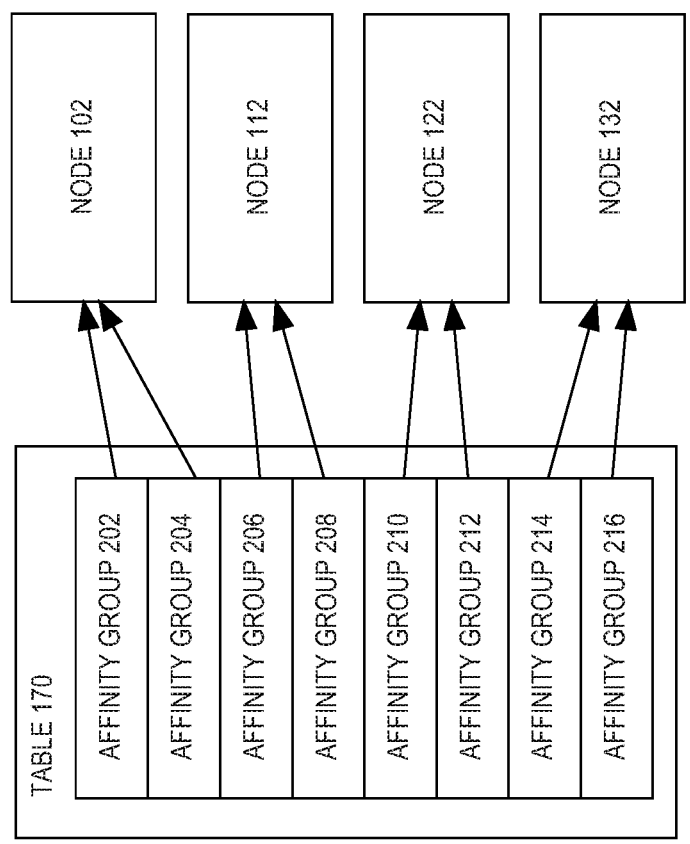
FIG. 2 is a block diagram illustrating a database object divided into affinity groups, according to an embodiment.

FIG. 2 illustrates an example affinity groups for table 170. Table 170 is divided into eight affinity groups (affinity groups 202-216). In the illustrated example, affinity groups 202 and 204 are assigned to node 102, affinity groups 206 and 208 are assigned to node 112, affinity groups 210 and 212 are assigned to node 122, and affinity groups 214 and 216 are assigned to node 132.

Each node is the master node for the affinity groups to which it is assigned. As an example, if node 102 receives a request for data in affinity group 202, then node 102 can grant itself a lock for the corresponding data blocks. If node 102 receives a request for data in affinity group 208, then node 102 requests a lock from node 112 and waits for the lock to be granted before accessing the data.

If a node is removed from the database system, then each affinity group that was assigned to the failed node is re-assigned to one of the remaining nodes in the database system. The node may be removed due to failure of the node, temporarily such as for maintenance, or permanently from the database system.

The re-assignment may be performed similarly to the initial assignment process described above. In an embodiment, the re-assignment does not affect affinity groups whose node did not fail. As an example, if node 112 fails, affinity groups 206 and 208 would each be re-assigned to one of nodes 102, 122, or 132. However, affinity groups 202, 204, 210, 212, 214, and 216 would not be re-assigned, since their assigned node did not fail. In other embodiments, the node assignment for all affinity groups are re-determined, for example, to maintain an even distribution of assignments of affinity groups to nodes.

Similarly, if a node joins or is re-added to the database system, then one or more affinity groups may be selected to be re-assigned to the new node. If there are fewer affinity groups than nodes, then no affinity groups may be re-assigned to the new node. In an embodiment, only the selected affinity groups are re-assigned. In other embodiments, the node assignment for all affinity groups are re-determined.

Affinity Group Mapping

After assigning affinity groups to nodes, the database system generates an affinity group mapping. The affinity group mapping comprises metadata indicating the master node for each affinity group. The affinity group mapping is sent to database clients that connect to the database system. Each database client stores a respective copy of the affinity group mapping. In an embodiment, if a plurality of database objects are divided into affinity groups, then a respective affinity group mapping is stored for each database object. Additional metadata may be stored indicating the respective affinity group mapping for each database object.

Figure 3:
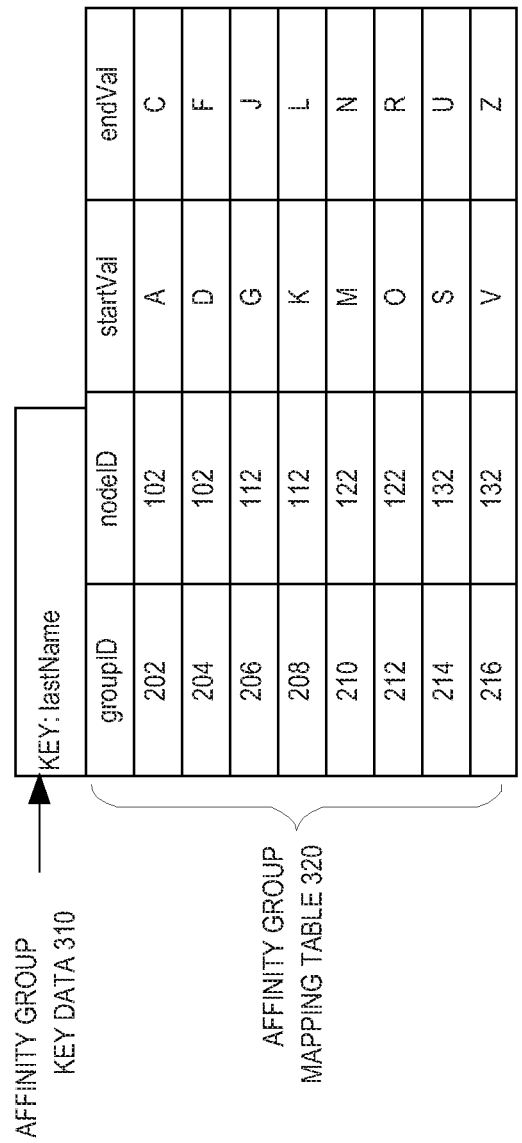
FIG. 3 is a block diagram illustrating an affinity group mapping, according to an embodiment.

FIG. 3 illustrates an example affinity group mapping for table 170. In the illustrated example, the affinity group mapping comprises affinity group key data 310 indicating the affinity group key on which the affinity groups are based, and table 320 indicating the master node for each affinity group.

Table 320 comprises four columns: an affinity group ID column, a node ID column, an affinity group key start value column, and an affinity group key end value column. Affinity group ID indicates a particular affinity group. The node ID indicates the master node for the particular affinity group. The affinity group key start value indicates the lower bound of the range of affinity group key values, and the affinity group key end value indicates the upper bound of the range of affinity group key values for the particular affinity group.

In an embodiment, after generating the affinity group mapping, the database system sends a notification to one or more database clients indicating that an affinity group mapping has been generated. The client requests the affinity group mapping from the database system. A node in the database system receives the request and sends the affinity group mapping to the client. The request for the affinity group mapping may be combined with request to perform other work, such as a query. In other embodiments, the database system may send the affinity group mapping to the client, after generating the affinity group mapping, without the client requesting the mapping. For example, rather than sending a notification to the database client, the database system sends the affinity group mapping.

When the database system re-assigns one or more affinity groups to different nodes, the database system generates an updated affinity group mapping. In an embodiment, the database system sends a notification to a client indicating that an updated affinity group mapping is available. The client may request the new affinity group mapping from the database system. Alternately, the database system may send the affinity group mapping with or instead of the notification.

Request Routing

Figure 4:
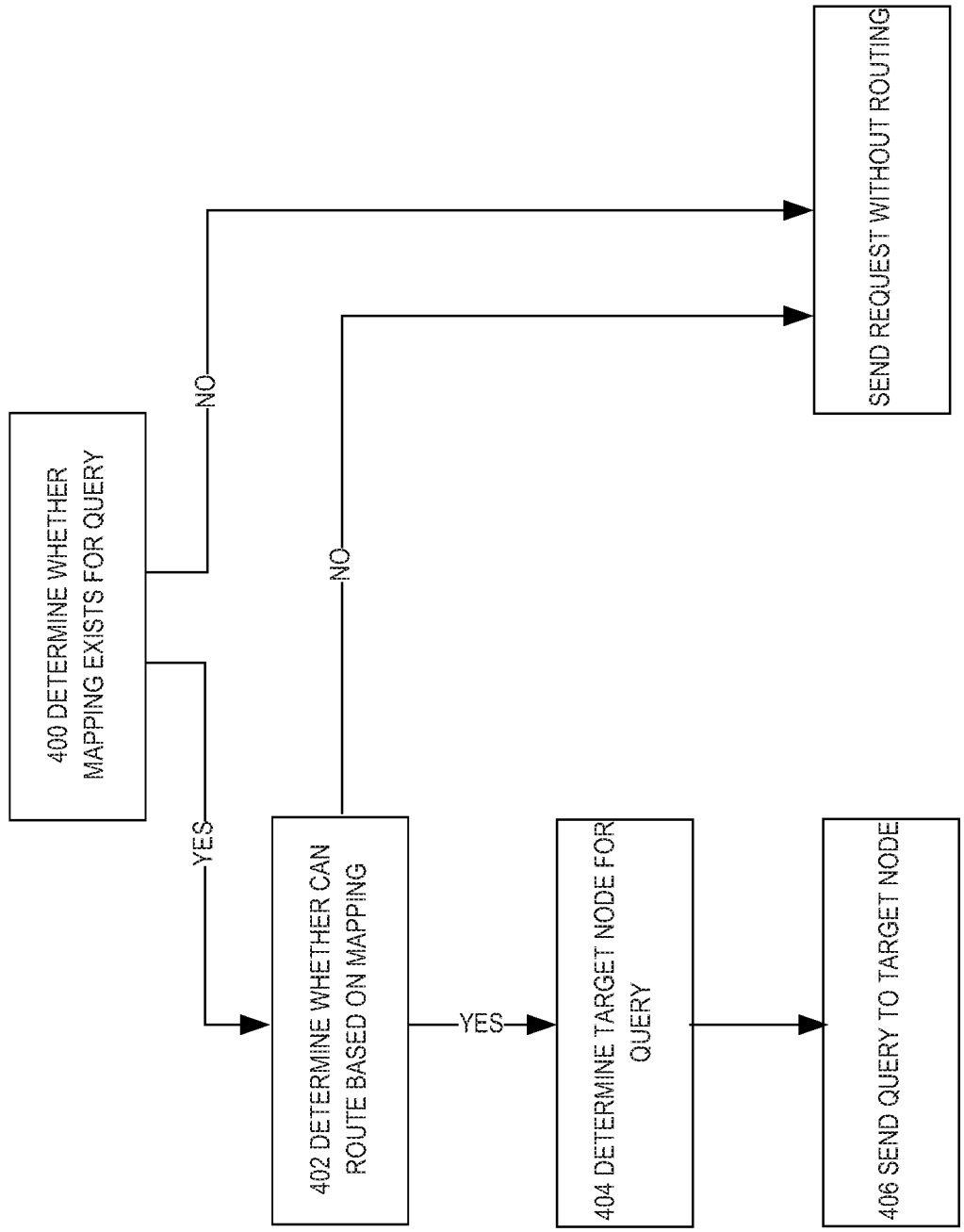
FIG. 4 is a flowchart illustrating steps for determining how to route a request, according to an embodiment.

Database clients may route queries to a particular node based on the affinity group mapping and the query. FIG. 4 illustrates an example process for a query router to determine how to route a particular query.

At step 400, the query router determines whether an affinity group mapping is stored for a database table targeted by the particular query. If no affinity group mapping exists, then the query router sends the particular query to the database system without using an affinity group mapping. The database system may select a particular node to handle the query without regard to the contents of the particular query. For example, the database system may use load balancing techniques to select the particular node from one or more nodes that are available to process the request, or the database system may randomly select the particular node.

If an affinity group mapping is stored for the database table, then the method proceeds to step 402. For example, assume database client 180 receives the query:

SELECT * from Customers WHERE
        lastName='Smith'

Query router 180 determines whether an affinity group mapping is stored for the "Customers" table. For the purpose of illustrating a clear example, assume query router 180 is storing an affinity group mapping for the "Customers" table, as shown in FIG. 3.

At step 402, the query router determines whether the query can be routed using the affinity group mapping. In an embodiment, a query may be routed based on an affinity group mapping if the query includes a predicate based on the affinity group key. Referring to the above example, the affinity group key for the "Customers" table is "lastName." Since the query includes the predicate "WHERE lastName='Smith'," which is based on the affinity group key "lastName," query router 180 determines that the query may be routed based on the affinity group mapping.

A query that targets a particular affinity group key value, such as the query shown in the example, is referred to as a point query. A query that targets a range of values is referred to as a range query. In an embodiment, only point queries may be routed using the affinity group mapping. In other embodiments, the query router may also route range queries using the affinity group mapping, based on the range of values specified by the query.

A query may also include a plurality of predicates on a plurality of columns. Each column in the plurality of columns may belong to a different table. In an embodiment, a particular table is specified, and the query is routed based on the affinity group mapping for the particular table. For example, the query router may be configured to route queries based on affinity group mapping for a particular table. As another example, the query specifies the particular table and one or more other tables that have not been divided into affinity groups.

In some embodiments, if several tables have been divided into affinity groups, a query specifying two or more tables can be routed if each table is divided into related affinity groups. For example, a first table and a second table may each include a "customer name" column, and the first table and the second table are both divided into affinity groups based on a "customer name" affinity group key. In other embodiments, the query router may be configured with a table hierarchy that indicates an order in which the affinity group mapping for a set of tables should be used to route a query. For example, if a query specifies an "orders" table and a "customers" table, but the "customers" table is higher in the hierarchy, then the query may be routed based on the affinity group mapping associated with the "customers" table.

If the query cannot be routed using the affinity group mapping, then the query router sends the particular query to the database system without routing using the affinity group mapping, as described above. If the query router determines that the query can be routed using the affinity group mapping, then the method proceeds to step 404.

At step 404, the query router determines, based on the query and the affinity group mapping, the node to which the query should be routed. If the query is a point query, the query router determines the particular affinity group to which the affinity group key value specified by the query belongs. The target node is the master node of the particular affinity group. The query router determines the master node based on the affinity group mapping.

In an embodiment, if the query is for a range of values, the query router determines whether the range of values falls within a particular affinity group. If the range of values fall within a particular affinity group, then the target node is the master node of the particular affinity group.

In some embodiments, if the range of values falls within several affinity groups, the query router determines which affinity group includes the largest range of values and selects the master node of that affinity group as the target node. Additionally or alternatively, the query router may select a plurality of target nodes, and the query may be routed to a particular node of the plurality of target nodes. Selecting a particular node may be based on, for example, load-balancing work between nodes.

In an embodiment, if the query does not specify either a particular value or a range of values, the query router determines which affinity group includes the largest range of affinity group key values and selects the master node of the affinity group as the target node.

Referring to the above example, affinity group 214 is associated with a range of values from "S" to "U." Thus, affinity group 214 includes the last name value "Smith" specified by the query. Affinity group mapping table 320 indicates that the master node for affinity group 214 is node 132. Based on the affinity group mapping, query router 180 selects node 132 as the target node.

In an embodiment, the query router may receive an affinity group key value in association with the query. The target node may be selected based on the affinity group key value received, rather than the contents of the query.

In step 406, the query router sends the query to the target node. The target node receives and processes the query. If no target node was selected, the query router sends the query to any node in the database system. The database system may select a node from a plurality of available nodes to receive the query. In the current example, query router 180 sends the query to node 132.

In an embodiment, if the target node is not available, then the database system sends the query to another node. For example, if a node failed but the affinity group mapping stored by the query router had not been updated, the query router may select the failed node as a target node. The database system receives the request to send a query to the failed node, and routes the query to a different, available node.

If the target node is no longer the master node of the affinity group, the target node may still process the received query. For example, if the affinity group was re-assigned a different master node but the affinity group mapping stored by the query router had not been updated, the query router may select a node that is not the master node as a target node. However, the target node can still process the query by accessing the requested data from the database after obtaining the necessary lock from the current master.

In an embodiment, the query router includes a request for an affinity group mapping, or an updated affinity group mapping, in addition to the query. The node that receives the query may send an affinity group mapping to the query router in addition to sending any data requested by the query. For example, if the query router previously received a notification from the database system indicating that an affinity group mapping was available, the query router may wait until it sends a query to send a request for the affinity group mapping.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
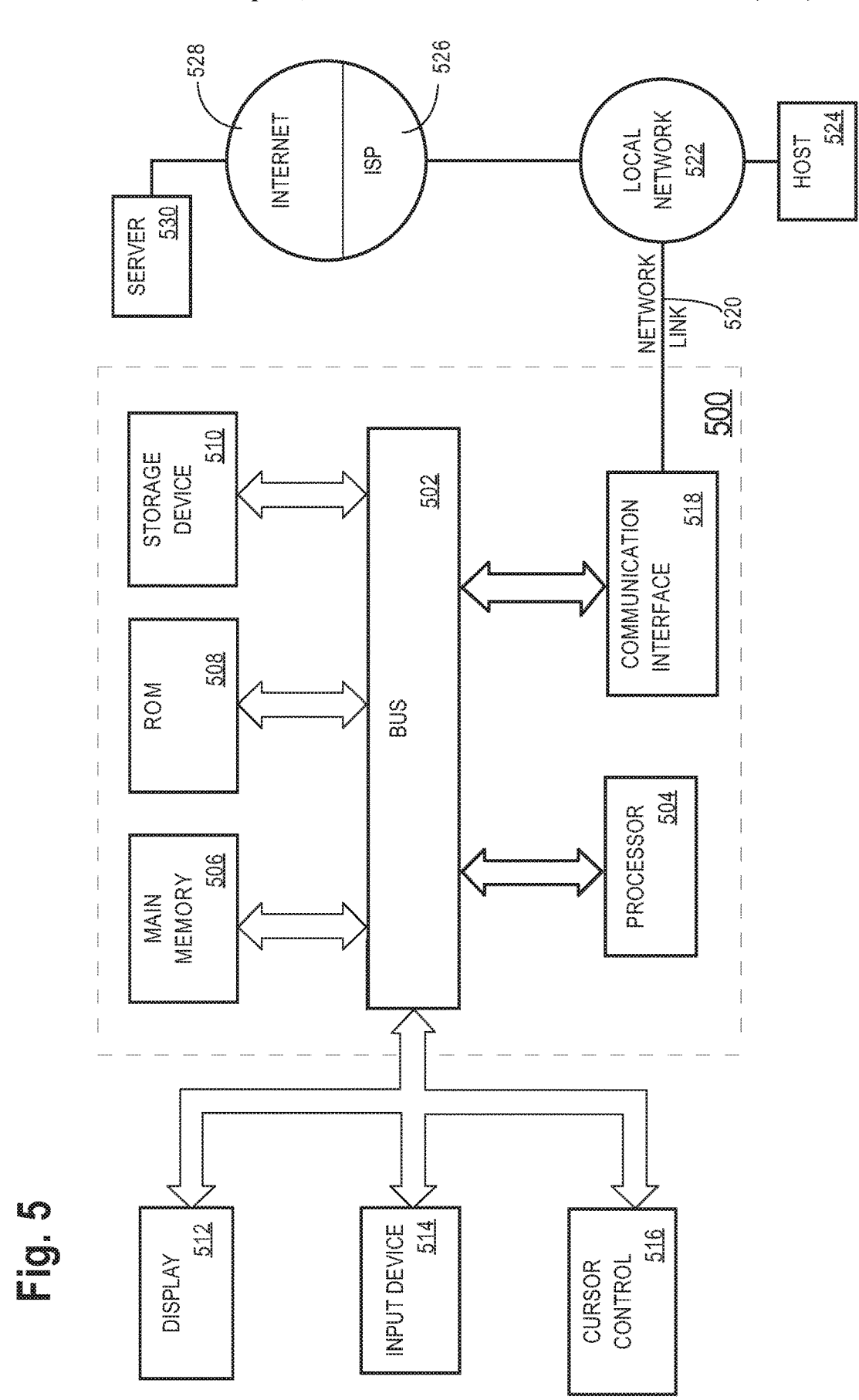
FIG. 5 is a block diagram illustrating a computer system that may be used to implement the techniques described herein.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

partitioning, into a plurality of affinity groups, a database table that is persistently stored on particular memory;

wherein partitioning the database table into the plurality of affinity groups is based on an affinity group key that corresponds to values in one or more columns of the database table;

wherein the database table includes a first portion assigned to a first affinity group, of the plurality of affinity groups, and a second portion assigned to a second affinity group, of the plurality of affinity groups;

wherein the database table is managed by a multi-node database management system (DBMS) that comprises a plurality of nodes;

wherein each node of the plurality of nodes executes a database server instance;

wherein the database server instance on each node of the plurality of nodes has shared access to the database table on the particular memory;

for each affinity group of the plurality of affinity groups, assigning a particular node of the plurality of nodes as a master node of said each affinity group;

wherein the master node of said each affinity group is responsible for managing locks for data, of the database table, that belong to said each affinity group;

wherein the step of assigning includes assigning the first affinity group to a first master node, of the plurality of nodes, and assigning the second affinity group to a second master node of the plurality of nodes;

sending, to a query router that is separate from and executing remotely relative to the plurality of nodes, a mapping indicating the master node for each affinity group of the plurality of affinity groups;

storing the mapping by the query router;

based on content of a particular query that requires data from the database table, determining whether the particular query should be routed using the mapping;

responsive to determining that the particular query should be routed using the mapping, the query router selecting a target node from the plurality of nodes, for the particular query, based on:

which portion of the database table is accessed by the particular query, and the mapping; and sending the particular query to the target node to cause the database server instance on the target node to process the particular query.

2. The method of claim 1 wherein the query router is a client application executing on a client node.

3. The method of claim 1 wherein the particular query is a first query, the method further comprising:

prior to sending a second query that requires data from the database table to the multi-node DBMS, determining, based on the second query, that the second query should not be routed based on the mapping; and selecting a node, of the plurality of nodes, to execute the second query without regard to the mapping.

4. The method of claim 3 wherein the target node for the first query is different than the node that is selected to execute the second query.

5. The method of claim 1 wherein each affinity group, of the plurality of affinity groups, corresponds to one or more ranges of the affinity group key, and wherein selecting the target node comprises determining that the target node is associated, in the mapping, with an affinity group that corresponds to an affinity group-specific key value range into which an affinity group key value, specified in the particular query, falls.

6. The method of claim 5 wherein the affinity group key value, specified in the particular query, is specified via a query-specified range of affinity group key values, and wherein the query-specified range of affinity group key values is included in the affinity group-specific key value range.

7. The method of claim 5 wherein the affinity group key value, specified in the particular query, is specified via a query-specified range of affinity group key values, and wherein the affinity group-specific key value range is included in one or more ranges, associated with the target node, that collectively include a largest portion of the query-specified range of affinity group key values specified in the particular query.

8. The method of claim 1 further comprising:

detecting that a node that is assigned to one or more affinity groups, of the plurality of affinity groups, has been removed;

assigning, for each affinity group of the one or more affinity groups, a different particular node as the master node of said each affinity group; and sending, to the query router, an updated mapping indicating the master node for the one or more affinity groups.

9. The method of claim 1 further comprising:

detecting that an additional node has been added;

assigning, for one or more affinity groups of the plurality of affinity groups, the additional node as the master node of the one or more affinity groups; and sending, to the query router, an updated mapping indicating the master node for the one or more affinity groups.

10. The method of claim 1 further comprising:

wherein the database table is a first database table and the plurality of nodes is a first plurality of nodes;

wherein the multi-node DBMS comprises a second plurality of nodes;

wherein each node of the second plurality of nodes executes a database server instance;

wherein the database server instance on each node of the second plurality of nodes has shared access to a second database table managed by the multi-node DBMS;

wherein the database server instance on each node of the second plurality of nodes does not have shared access to the first database table; and wherein the database server instance on each node of the first plurality of nodes does not have shared access to the second database table;

partitioning, into a second plurality of affinity groups, the second database table;

for each affinity group of the second plurality of affinity groups, assigning a particular node of the second plurality of nodes as a master node of said each affinity group; and sending, to the query router, a second mapping indicating the master node for each affinity group of the second plurality of affinity groups.

11. A method comprising:
partitioning, into a plurality of affinity groups, a database table that is persistently stored on particular memory;
wherein partitioning the database table into the plurality of affinity groups is based on an affinity group key that corresponds to values in one or more columns of the database table;
wherein the database table includes a first portion assigned to a first affinity group, of the plurality of affinity groups, and a second portion assigned to a second affinity group, of the plurality of affinity groups;
wherein the database table is managed by a multi-node database management system (DBMS) that comprises a plurality of nodes;
wherein each node of the plurality of nodes executes a database server instance;
wherein the database server instance on each node of the plurality of nodes has shared access to the database table on the particular memory;
for each affinity group of the plurality of affinity groups, assigning a particular node of the plurality of nodes as a master node of said each affinity group;
wherein the master node of said each affinity group is responsible for managing locks for data, of the database table, that belong to said each affinity group;
wherein the step of assigning includes assigning the first affinity group to a first master node, of the plurality of nodes, and assigning the second affinity group to a second master node of the plurality of nodes;
sending, to a query router that is separate from and executing remotely relative to the plurality of nodes, a mapping indicating the master node for each affinity group of the plurality of affinity groups;
storing the mapping by the query router;
based on content of a particular query that requires data from the database table, determining whether the particular query should be routed using the mapping;
wherein determining whether the particular query should be routed using the mapping is based on one or more columns referenced in a predicate of the particular query;
responsive to determining that the particular query should be routed using the mapping, the query router selecting a target node from the plurality of nodes, for the particular query, based, at least in part, on the mapping; and
sending the particular query to the target node to cause the database server instance on the target node to process the particular query.

12. The method of claim 11 wherein:
partitioning the database table into the plurality of affinity groups is based on an affinity group key that corresponds to one or more key columns of the database table; and
said determining whether the particular query should be routed using the mapping based on one or more columns referenced in the predicate of the particular query further comprises determining whether the one or more columns are the one or more key columns.

13. The method of claim 12 wherein each affinity group, of the plurality of affinity groups, corresponds to one or more ranges of the affinity group key, and wherein selecting the target node comprises determining that the target node is associated, in the mapping, with an affinity group that corresponds to an affinity group-specific key value range into which an affinity group key value, specified in the particular query, falls.

14. The method of claim 13 wherein the affinity group key value, specified in the particular query, is specified via a query-specified range of affinity group key values, and wherein the query-specified range of affinity group key values is included in the affinity group-specific key value range.

15. The method of claim 13 wherein the affinity group key value, specified in the particular query, is specified via a query-specified range of affinity group key values, and wherein the affinity group-specific key value range is included in one or more ranges, associated with the target node, that collectively include a largest portion of the query-specified range of affinity group key values specified in the particular query.

16. One or more non-transitory computer-readable media storing one or more sequences of instructions that, when executed by one or more hardware processors, cause:
partitioning, into a plurality of affinity groups, a database table that is persistently stored on particular memory;
wherein partitioning the database table into the plurality of affinity groups is based on an affinity group key that corresponds values in to one or more columns of the database table;
wherein the database table includes a first portion assigned to a first affinity group, of the plurality of affinity groups, and a second portion assigned to a second affinity group, of the plurality of affinity groups;
wherein the database table is managed by a multi-node database management system (DBMS) that comprises a plurality of nodes;
wherein each node of the plurality of nodes executes a database server instance;
wherein the database server instance on each node of the plurality of nodes has shared access to the database table on the particular memory;
for each affinity group of the plurality of affinity groups, assigning a particular node of the plurality of nodes as a master node of said each affinity group;
wherein the master node of said each affinity group is responsible for managing locks for data, of the database table, that belong to said each affinity group;
wherein the step of assigning includes assigning the first affinity group to a first master node, of the plurality of nodes, and assigning the second affinity group to a second master node of the plurality of nodes;
sending, to a query router that is separate from and executing remotely relative to the plurality of nodes, a mapping indicating the master node for each affinity group of the plurality of affinity groups;
storing the mapping by the query router;
based on content of a particular query that requires data from the database table, determining whether the particular query should be routed using the mapping;
responsive to determining that the particular query should be routed using the mapping, the query router selecting a target node from the plurality of nodes, for the particular query, based on:
which portion of the database table is accessed by the particular query, and the mapping; and
sending the particular query to the target node to cause the database server instance on the target node to process the particular query.

17. The one or more non-transitory computer-readable media of claim 16 wherein the query router is a client application executing on a client node.

18. The one or more non-transitory computer-readable media of claim 16, wherein the particular query is a first query, and the one or more sequences of instructions further comprising instructions that, when executed by one or more hardware processors cause:

prior to sending a second query that requires data from the database table to the multi-node DBMS, determining, based on the second query, that the second query should not be routed based on the mapping; and selecting a node, of the plurality of nodes, to execute the second query without regard to the mapping.

19. The one or more non-transitory computer-readable media of claim 18, Wherein the target node for the first query is different than the node that is selected to execute the second query.

20. The one or more non-transitory computer-readable media of claim 16, wherein each affinity group, of the plurality of affinity groups, corresponds to one or more ranges of the affinity group key, and wherein selecting the target node comprises determining that the target node is associated, in the mapping, with an affinity group that corresponds to an affinity group-specific key value range into which an affinity group key value, specified in the particular query, falls.

21. The one or more non-transitory computer-readable media of claim 20, wherein the affinity group key value, specified in the particular query, is specified via a query-specified range of affinity group key values, and wherein the query-specified range of affinity group key values is included in the affinity group-specific key value range.

22. The one or more non-transitory computer-readable media of claim 20, wherein the affinity group key value, specified in the particular query, is specified via a query-specified range of affinity group key values, and wherein the affinity group-specific key value range is included in one or more ranges, associated with the target node, that collectively include a largest portion of the query-specified range of affinity group key values specified in the particular query.

23. The one or more non-transitory computer-readable media of claim 16, the one or more sequences of instructions further comprising instructions that, when executed by one or more hardware processors, cause:

detecting that a node that is assigned to one or more affinity groups, of the plurality of affinity groups, has been removed;

assigning, for each affinity group of the one or more affinity groups, a different particular node as the master node of said each affinity group; and sending, to the query router, an updated mapping indicating the master node for the one or more affinity groups.

24. The one or more non-transitory computer-readable media of claim 16, the one or more sequences of instructions further comprising instructions that, when executed by one or more hardware processors, cause:

detecting that an additional node has been added;

assigning, for one or more affinity groups of the plurality of affinity groups, the additional node as the master node of the one or more affinity groups; and sending, to the query router, an updated mapping indicating the master node for the one or more affinity groups.

25. The one or more non-transitory computer-readable media of claim 16, the one or more sequences of instructions further comprising instructions that, when executed by one or more hardware processors cause:

wherein the database table is a first database table and the plurality of nodes is a first plurality of nodes;

wherein the multi-node DBMS comprises a second plurality of nodes;

wherein each node of the second plurality of nodes executes a database server instance;

wherein the database server instance on each node of the second plurality of nodes has shared access to a second database table managed by the multi-node DBMS;

wherein the database server instance on each node of the second plurality of nodes does not have shared access to the first database table; and wherein the database server instance on each node of the first plurality of nodes does not have shared access to the second database table;

partitioning, into a second plurality of affinity groups, the second database table;

for each affinity group of the second plurality of affinity groups, assigning a particular node of the second plurality of nodes as a master node of said each affinity group; and sending, to the query router, a second mapping indicating the master node for each affinity group of the second plurality of affinity groups.

26. One or more non-transitory computer-readable media storing one or more sequences of instructions that, when executed by one or more hardware processors, cause:

partitioning, into a plurality of affinity groups, a database table that is persistently stored on particular memory;

wherein partitioning the database table into the plurality of affinity groups is based on an affinity group key that corresponds to values in one or more columns of the database table;

wherein the database table includes a first portion assigned to a first affinity group, of the plurality of affinity groups, and a second portion assigned to a second affinity group, of the plurality of affinity groups;

wherein the database table is managed by a multi-node database management system (DBMS) that comprises a plurality of nodes;

wherein each node of the plurality of nodes executes a database server instance;

wherein the database server instance on each node of the plurality of nodes has shared access to the database table on the particular memory;

for each affinity group of the plurality of affinity groups, assigning a particular node of the plurality of nodes as a master node of said each affinity group;

wherein the master node of said each affinity group is responsible for managing locks for data, of the database table, that belong to said each affinity group;

wherein the step of assigning includes assigning the first affinity group to a first master node, of the plurality of nodes, and assigning the second affinity group to a second master node of the plurality of nodes;

sending, to a query router that is separate from and executing remotely relative to the plurality of nodes, a mapping indicating the master node for each affinity group of the plurality of affinity groups;

storing the mapping by the query router;

based on content of a particular query that requires data from the database table, determining whether the particular query should be routed using the mapping;

wherein determining whether the particular query should be routed using the mapping is based on one or more columns referenced in a predicate of the particular query;

responsive to determining that the particular query should be routed using the mapping, the query router selecting a target node from the plurality of nodes, for the particular query, based, at least in part, on the mapping; and sending the particular query to the target node to cause the database server instance on the target node to process the particular query.

27. The one or more non-transitory computer-readable media of claim 26 Wherein:

partitioning the database table into the plurality of affinity groups is based on an affinity group key that corresponds to one or more key columns of the database table; and said determining whether the particular query should be routed using the mapping based on one or more columns referenced in the predicate of the particular query further comprises determining whether the one or more columns are the one or more key columns.

28. The one or more non-transitory computer-readable media of claim 27 Wherein each affinity group, of the plurality of affinity groups, corresponds to one or more ranges of the affinity group key, and wherein selecting the target node comprises determining that the target node is associated, in the mapping, with an affinity group that corresponds to an affinity group-specific key value range into which an affinity group key value, specified in the particular query, falls.

29. The one or more non-transitory computer-readable media of claim 28 Wherein the affinity group key value, specified in the particular query, is specified via a query-specified range of affinity group key values, and wherein the query-specified range of affinity group key values is included in the affinity group-specific key value range.

30. The one or more non-transitory computer-readable media of claim 28 Wherein the affinity group key value, specified in the particular query, is specified via a query-specified range of affinity group key values, and wherein the affinity group-specific key value range is included in one or more ranges, associated with the target node, that collectively include a largest portion of the query-specified range of affinity group key values specified in the particular query.

* * * * *

UNITED STATES PATENT AND TRADEMARK OFFICE
CERTIFICATE OF CORRECTION

PATENT NO. : 11,954,117 B2
APPLICATION NO. : 15/845747
DATED : April 9, 2024
INVENTOR(S) : Loaiza et al.

It is certified that error appears in the above-identified patent and that said Letters Patent is hereby corrected as shown below:

In the Claims

In Column 15, Line 11, in Claim 19, delete "Wherein" and insert -- wherein --, therefor.

In Column 17, Line 8, in Claim 27, delete "Wherein:" and insert -- wherein: --, therefor.

In Column 17, Line 19, in Claim 28, delete "Wherein" and insert -- wherein --, therefor.

In Column 18, Line 7, in Claim 29, delete "Wherein" and insert -- wherein --, therefor.

In Column 18, Line 14, in Claim 30, delete "Wherein" and insert -- wherein --, therefor.

Signed and Sealed this
Sixth Day of August, 2024

Katherine Kelly Vidal
*Director of the United States Patent and Trademark Office*